Jan. 28, 1969  R. E. PECHACEK ET AL  3,423,820
METHOD OF FORMING PRE-STRESSED LAMINATED HEADS
Filed March 28, 1966  Sheet 2 of 3
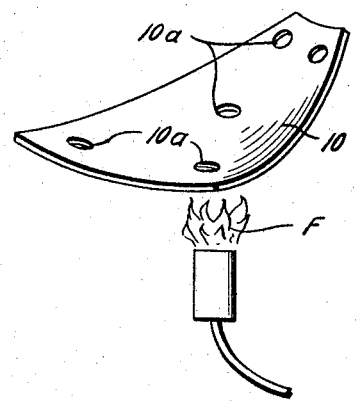
Fig. 6
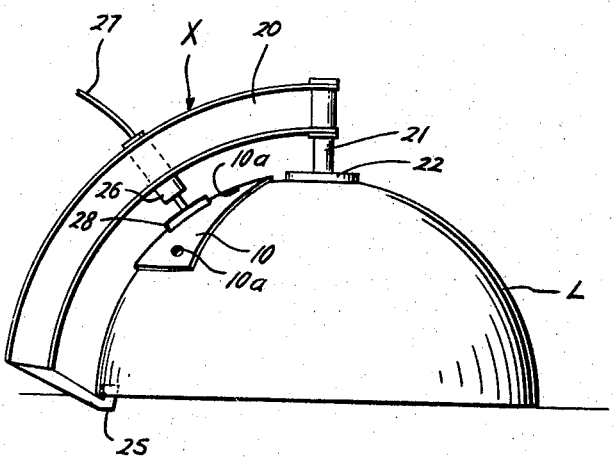
Fig. 7
Fig. 8
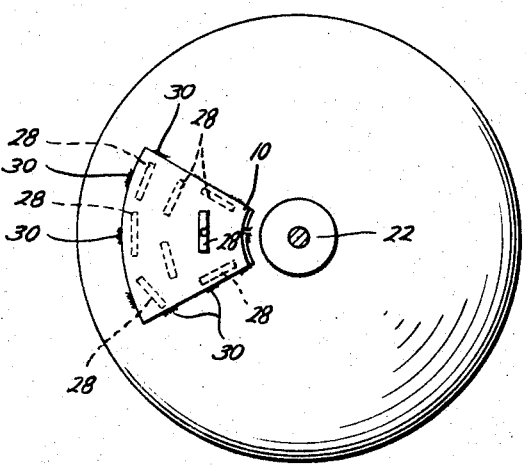
Raymond E. Pechacek
Eugene J. Clay
Lawrence F. Megow
INVENTORS
BY Hayden & Pravel
ATTORNEYS Jan. 28, 1969    R. E. PECHACEK ET AL    3,423,820
METHOD OF FORMING PRE-STRESSED LAMINATED HEADS Filed March 28, 1966

Raymond E. Pechacek
Eugene J. Clay
Lawrence F. Megow
INVENTORS

BY Hayden & Pravel
ATTORNEYS

0
United States Patent Office 3,423,820
Patented Jan. 28, 1969

3,423,820
METHOD OF FORMING PRE-STRESSED LAMINATED HEADS
Raymond E. Pechacek, Eugene J. Clay, and Lawrence F. Megow, Houston, Tex., assignors to Hahn & Clay, a corporation of Texas
Filed Mar. 28, 1966, Ser. No. 537,804
U.S. Cl. 29—447
Int. Cl. B23p 11/02; B23k 31/02
9 Claims

ABSTRACT OF THE DISCLOSURE

Method of forming pre-stressed laminated pressure vessel heads and the like by welding a plurality of curved gores to a solid inner layer shaped to the configuration of at least a partial sphere, with sufficient weld metal being deposited to cause the gores to shrink and place the inner layer under compression when the weld cools. Pre-stressing may also be effected by heating each of the gores to a temperature which is substantially higher than the temperature of the inner layer.

---

Although pre-stressed laminated pressure vessel cylinders, one type of which is shown in U.S. Patent No. 2,480,369 have been manufactured extensively for a number of years, the heads or end closures for such cylinders to thus form them into pressure vessels have been of conventional solid forging or solid formed plate. Laminated heads were proposed as long ago as 1931 in U.S. Patent No. 1,925,118, although so far as known, no one prior to the present invention has successfully manufactured pre-stressed laminated heads wherein the pre-stress was comparable to that obtained for pre-stressed laminated cylinders. Thus, heretofore, the limitations imposed by the heads has limited the pressures to which the entire vessel could be subjected in use.

It is an object of the present invention to provide a new and improved method of manufacturing pre-stressed laminated pressure vessel heads and the like.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIGS. 1-8 illustrate the method steps of this invention in sequence according to the preferred form of the invention;

Figure 2:
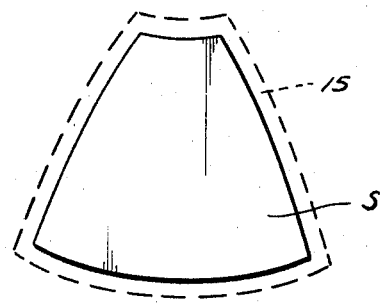
Figure 3:
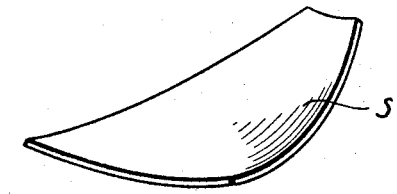
Figure 4:
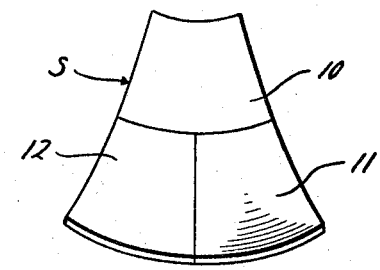
Figure 5:
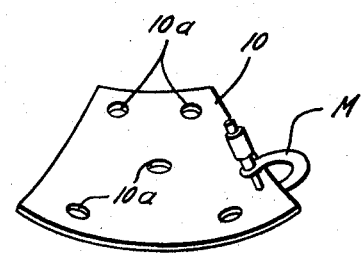
Figure 9:
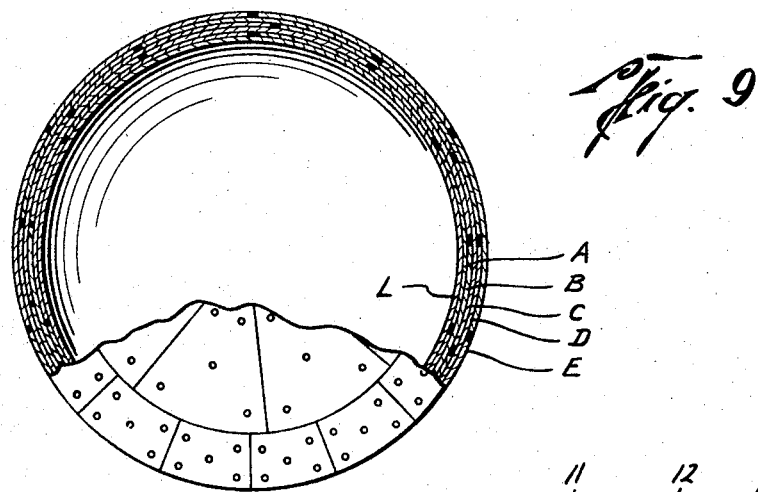
FIG. 9 is a sectional view taken on line 9—9 of FIG. 10 to show a portion of a pre-stressed laminated steel head manufactured according to the method of this invention.

In the drawings, the letter H designates a completed head or closure (FIG. 10) for a pressure vessel. Such head H is preferably in the form of a hemisphere or some other partial sphere, with an inner layer L (FIG. 7) forming the base for such head H and with outer layers welded thereto in the form of sectors S (FIGS. 2–4). As will be explained, it is preferable to cut the sectors S into gores such as indicated at 10, 11 and 12 before welding the sectors to the inner layer L or to subsequent outer layers formed by the sectors S. With the present invention, a relatively large number of the sectors S, or gores cut therefrom, are applied to form each of the outer layers indicated at A, B, C, D, and E, in FIG. 9. A pre-stress is obtained in the head H, and particularly in the inner layer L, by reason of the large number of welds formed during the welding of each layer to the layer therebelow. Due to the relatively large number of welds on each of the outer layers, and the initial close contact between each of the sectors and the layer therebelow, as will be more fully expalined, the head H is pre-stressed when the welds cool. Additional pre-stressing is also obtained in the preferred form of the invention by applying the sectors S in a heated condition and allowing them to shrink by cooling to ambient or operating temperatures. Thus, the present invention makes it possible to obtain a pre-stress in the head H without the necessity for applying an external pre-stressing force such as disclosed for the cylinders in the above-identified Patent 2,480,369.

Considering the invention more in detail, the inner layer L is initially formed by a conventional method such as forging or forming. Such inner layer L is a solid layer with no openings therein since it is the fluid retaining element of the final head H. Normally, the layer L is quenched and tempered steel, stainless steel or carbon steel, approximately one-half inch in thickness, although it may be of a lesser or greater thickness, usually depending upon the number of outer layers to be applied thereto, and the amount of pre-stress desired in the inner layer L. In the usual case, the inner layer L is in the form of a hemisphere, although it may take other configurations for forming the end closure at each end of a laminated cylinder to complete the manufacture of a pressure vessel.

Figure 1:
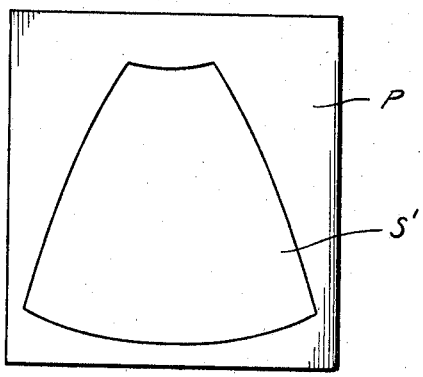

The sectors S forming each of the outer layers are initially cut from pieces of conventional steel plate P, such as carbon steel, or quenched and tempered steel, using a cutting torch or the like for forming the rough cut sector S' (FIG. 1). Thereafter, each of the rough cut sectors S' is trimmed to size removing the portion indicated in dotted lines at 15 in FIG. 2 to form the final trimmed sector S. The sector S is then formed to the proper curvature in conventional dies so that it assumes the shape indicated in FIG. 3.

Subsequently, each of the sectors S is cut into a plurality of gores 10, 11 and 12 so as to provide a larger number of gores at the lower portion of each outer layer than at the upper or intermediate portion thereof. Although not illustrated as such, the corners of the gores are rounded or curved when using quenched and tempered steel to provide uninterrupted welds at such corners. By cutting each of the sectors S into the plurality of gores 10, 11, and 12, it was found that an adequate amount of weld area was provided to produce an actual pre-stressing of the head H. It was found that it was impossible to mathematically calculate how much weld should be provided to obtain pre-stress in the head H but if such weld area is not adequate, pre-stressing is not produced. The most critical factors in obtaining the pre-stress included initial close contact between the layers 10, 11 and 12 and the inner layer L during welding coupled with the relatively large surface area of the welds uniformly distributed over each of the outer layers. In actual practice, it was found quite unexpectedly that the use of the sectors S without cutting them into a plurality of gores did not produce the pre-stressing of the layer L.

In order to obtain the close contact between each of the gores 10, 11, and 12 and the external surface of the inner layer L, a plurality of holes such as indicated at 10a in the gore 10 were drilled at spaced areas for measuring purposes, as will be explained. Holes 11a and 12a were also drilled in each of the other gores 11 and 12 in representative positions distributed over the gore area. The thickness of each of the gores was measured with a micrometer M of conventional construction. Since the plate P used for forming the sectors S is preferably the conventional steel plate, the thickness of each of the gores 10, 11 and 12 varies in different areas of each gore. It should also be noted that one of the advantages of the present invention is that conventional steel plates may be used for the layers rather than requiring extremely accurately formed plates or machining operations.

After the holes 10a have been drilled or otherwise formed in the gore 10, the gore 10 is heated by any suitable flame F to a temperature preferably in the neighborhood of 500° F. The inner head or layer L is preferably preheated and maintained at a temperature of about 175° to 200° F., assuming such inner layer L is made of quenched and tempered steel, although the temperature of preheat may vary as is well understood by those skilled in the art for the most efficient welding. In any event, the individual gores 10, 11 and 12 are all preheated to a temperature considerably higher than the temperature of the inner layer L so that upon subsequent cooling to ambient or operating temperatures, the shrinkage induced into each of the gores is transmitted to the inner layer L to effect an additional pre-stress in the layer L.

While the gore 10 is still heated, and is preferably at least as hot as 300° F., it is placed in position on the external surface of the inner layer L (FIG. 7) and is forced into tight close contact with the external surface of such head L by means of any suitable apparatus such as indicated at X. The apparatus X is shown in a simplified form, wherein an external curved frame 20 is pivotally mounted on a pivot support or pin 21. The pivot pin 21 is formed integrally with or otherwise connected to a base 22 which in turn is temporarily welded or secured to the upper end of the inner layer L. The lower end of the frame 20 preferably has a hook or attachment member 25 which engages on the inner surface of the layer L or some other projection at the bottom of such inner layer L. A hydraulic cylinder 26 supplied with hydraulic fluid through an inlet tube 27 operates a piston with a movable head or ram 28 formed thereon. The ram 28 is in the form of a bar in the preferred apparatus X and is adapted to be positioned at various areas of the gore 10 such as indicated by the solid line and the dotted line positions of such ram 28 in FIG. 8.

Initially, the ram 28 is positioned adjacent one side of the gore 10 and tack welds 30 are provided. The ram 28 is moved to different positions adjacent to each of the tack welds 30, the number of which depends upon the size of the gore.

Figure 10:
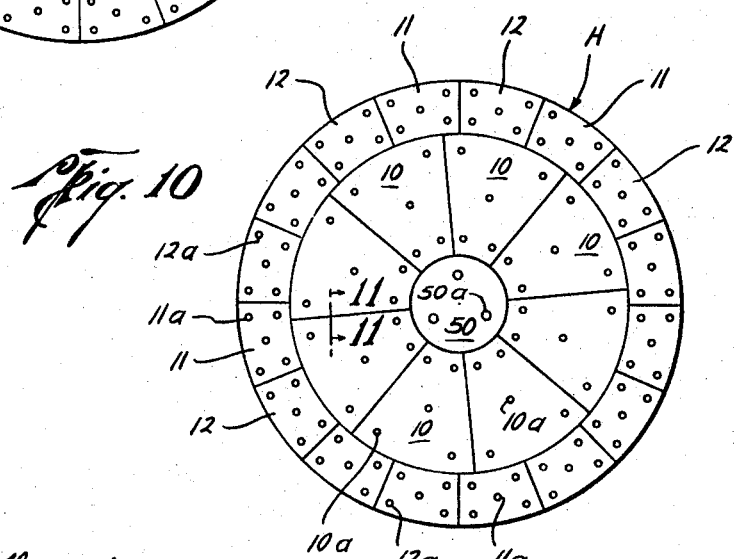
FIG. 10 is a plan view of a laminated pre-stressed head made according to the method of this invention.

Each of the other gores 10 in addition to the first gore illustrated in FIGS. 7 and 8 are then added by the same process steps. Subsequently, the lower gores 11 and 12 are formed in the same manner as explained heretofore in connection with the gore 10 and are welded below the gores 10 in an offset position with respect to the gores 10, as best seen in FIG. 10.

The final welds between each of the gores are then made, or if desired, the final welds may be made when adjacent gores are positioned and properly tack welded.

Figure 11:
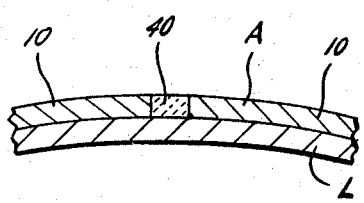
FIG. 11 is a sectional view taken on line 11—11 of FIG. 10, illustrating only the inner layer and the first outer layer with a completed weld between two of the sectors and with the inner layer.

After the final welds are made, an example of which is shown in section at 40 in FIG. 11, they are ground flush with the external surface of the gores 10, 11 and 12 so that the final first layer A appears to be a homogeneous layer when completed.

The holes 10a previously mentioned in connection with the gores 10, and similar holes 11a and 12a for the other gores 11 and 12 are then used to measure the amount of gap between each gore and the external surface of the inner layer L therebelow. It has been found that in order to get pre-stress in the inner layer L, it is essential to obtain contact, or substantial contact, between the inner surface of each of the gores and the external surface of the inner layer L. Thus, the measurement of such gap is important and is made possible because of the holes provided in each of the gores. In the event the gap is excessive, the gore is lanced or cut by forming a slit across the gore in the area of the excessive gap and then it is rewelded to reduce such gap. It should be noted that the gores 11 and 12 are offset laterally with respect to the gore 10, which neutralizes or balances out irregularities in thickness which may occur by the use of the conventional steel plate P. It is also important to note that the number of the gores 11 and 12 is greater than the gores 10 thereabove so that in the area of greater circumference on the inner layer L, there is a greater shrinkage by the welds applied between the gores 11 and 12 as compared to the welds between the gores 10. This additional weld shrinkage due to the additional number of gores 11 and 12 as compared to the gores 10 more uniformly distributes the shrinkage force to the entire area of the inner layer L to obtain a substantially uniform pre-stress force throughout the entire inner layer L.

After the first outer layer A is formed on the inner layer L, additional outer layers B, C, D, and E, as well as other layers if so desired, are applied to the layers therebelow in the same manner as described heretofore for the first outer layer A until the desired thickness of the head H has been obtained.

The base 22 of the pivot pin or support 21 is removed after all of the layers have been applied to form the head H. In many instances, the central portion of the head H will have a flange for receiving a fitting or cover, but if the central area of the inner layer L is to be covered with layers of steel, a circular section 50 preferably also having measuring holes 50a (FIG. 10) may be added corresponding to each of the outer layers, and each of which may be brought into close contact and welded to obtain a pre-stress in the central area as well.

The extent of the pre-stress obtained with the method of this invention can be indicated by measuring the diameter of the inner layer L before applying any of the outer layers and then measuring such diameter again after all of the outer layers have been applied and the entire head H has cooled to ambient or operating temperature. The reduction in the inner diameter of the inner layer L is a direct indication of the compression or actual pre-stress in such inner layer L. In some cases, in addition to the inner layer, some of the outer layers will also be under compression.

Thus, with the present invention, by bringing the gores into close contact with the external surface of the layer therebelow and by providing a large number of welds uniformly distributed over each layer, a pre-stress force is developed by the shrinkage of the welds. Furthermore, an additional pre-stress is developed by the cooling of the gores from their preliminary heating. By providing the larger number of gores near the lower portion of the head H as compared to the gores at the intermediate and upper portions of the head H, the weld areas are increased in the areas of larger circumference to uniformly distribute the pre-stress force exerted on the inner layer L and subsequent areas below the layer being applied. The pre-stressing of the inner layer L is thus obtained without the use of a squeezing external force which actually causes the pre-stress by such squeezing action.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:
1. A method of forming pre-stressed laminated pressure vessel heads and the like, comprising the steps of:
  (a) providing a solid inner layer shaped to the configuration of at least a partial sphere,
  (b) forming a plurality of curved gores which together provide the first outer layer substantially covering the external surface of said inner layer,

(c) depositing weld metal around the entire periphery of each of said gores of the first outer layer to weld said gores to the inner layer and also depositing weld metal between the entire area between adjacent gores, (d) applying an external compressive force on each of said gores during welding thereof in a direction to cause the inner curved surface of each gore to engage in close contact with the outer surface of the solid inner layer therebelow to obtain a predetermined minimum gap between each of the gores and the inner layer, and (e) depositing a sufficient amount of the weld metal around the entire periphery of each gore to cause a shrinkage of the outer layer to place the inner layer under compression when the welds cool to thereby pre-stress same.

2. The method set forth in claim 1, including the steps of:
   (a) forming a plurality of holes through each of said gores which are distributed in representative areas of each gore prior to welding same to said inner layer, and
   (b) inserting a measuring device into each of said holes to determine the amount of gap, if any, between each of the gores and the external surface of the inner layer after welding same to the inner layer.

3. The method set forth in claim 1, including the steps of:
   (a) forming the gores by cutting them from sectors prior to welding the gores to the outer layer, and
   (b) offsetting at least one of the gores of each sector with respect to at least one other of the gores to effect a substantial balancing out of irregularities in the thickness of each sector.

4. The method set forth in claim 1, including the steps of:
   (a) providing a plurality of additional outer layers on said first outer layer, each of which is formed by a plurality of gores,
   (b) offsetting the gores on each successive layer, and
   (c) thereafter welding and compressing each of the gores for each of the outer layers until a predetermined thickness is obtained.

5. The method set forth in claim 1, including the steps of:
   (a) forming an upper gore and two lower gores from a sector prior to welding, and
   (b) laterally offsetting the two lower gores with respect to the upper gore in each sector to distribute any irregularities in plate thickness of each sector.

6. The method set forth in claim 1, including the steps of:
   (a) heating each of said gores to a temperature which is substantially higher than the temperature of said inner layer,
   (b) applying each of the gores while heated, and
   (c) allowing each of the gores to cool after welding same to the inner layer to further shrink the outer layer to place the inner layer in additional pre-stress.

7. The method set forth in claim 1, including the steps of:
   (a) forming the gores by cutting them from sectors prior to welding the gores to the outer layer,
   (b) forming a plurality of holes through each of said gores which holes are distributed in representative areas of each gore, and
   (c) determining the amount of gap, if any, between each of the gores and the inner layer by measuring the gap therebetween at each of the holes so that an immediate rewelding of a gore can be effected if an excessive gap is found to exist.

8. The method set forth in claim 1, including the steps of:
   (a) applying the compressive force to each of the gores at a plurality of spaced areas while initially tack welding each gore in place on the inner layer, and
   (b) thereafter completing the final welds of each gore to the inner layer and to the adjacent gores.

9. A method of forming pre-stressed laminated pressure vessel heads and the like, comprising the steps of:
   (a) providing a solid inner layer shaped to the configuration of at least a partial sphere,
   (b) forming a plurality of curved gores which together provide the first outer layer substantially covering the external surface of said inner layer,
   (c) depositing weld metal around the entire periphery of each of said gores of the first outer layer to weld said gores to the inner layer and also depositing weld metal between the entire area between adjacent gores,
   (d) applying an external compressive force on each of said gores during welding thereof in a direction to cause the inner curved surface of each gore to engage in close contact with the outer surface of the solid inner layer therebelow to obtain a predetermined minimum gap between each of the gores and the inner layer,
   (e) heating each of said gores to a temperature which is substantially higher than the temperature of said inner layer,
   (f) applying each of the gores while heated, and
   (g) allowing each of said gores to cool after welding same to the inner layer to shrink the outer layer to place the inner layer in pre-stress.

References Cited

UNITED STATES PATENTS

| | | | |
|---|---|---|---|
| Re. 22,251 | 1/1943 | Stresau | 29—471.1 X |
| 2,337,247 | 12/1943 | Kepler | 29—446 X |
| 2,609,595 | 9/1952 | Rossheim | 29—447 |
| 2,652,943 | 9/1953 | Williams | 29—471.1 X |
| 3,024,938 | 3/1962 | Watter | 29—471.1 X |
| 3,037,275 | 6/1962 | Schmitz | 29—471.1 |
| 3,046,647 | 7/1962 | Carstens | 29—446 X |
| 3,052,021 | 9/1962 | Needham | 29—471.1 |
| 3,245,178 | 4/1966 | Clark | 29—471.1 |

JOHN F. CAMPBELL, *Primary Examiner.*

J. L. CLINE, *Assistant Examiner.*

U.S. Cl. X.R.

29—471.1, 471.3